Figure 1:
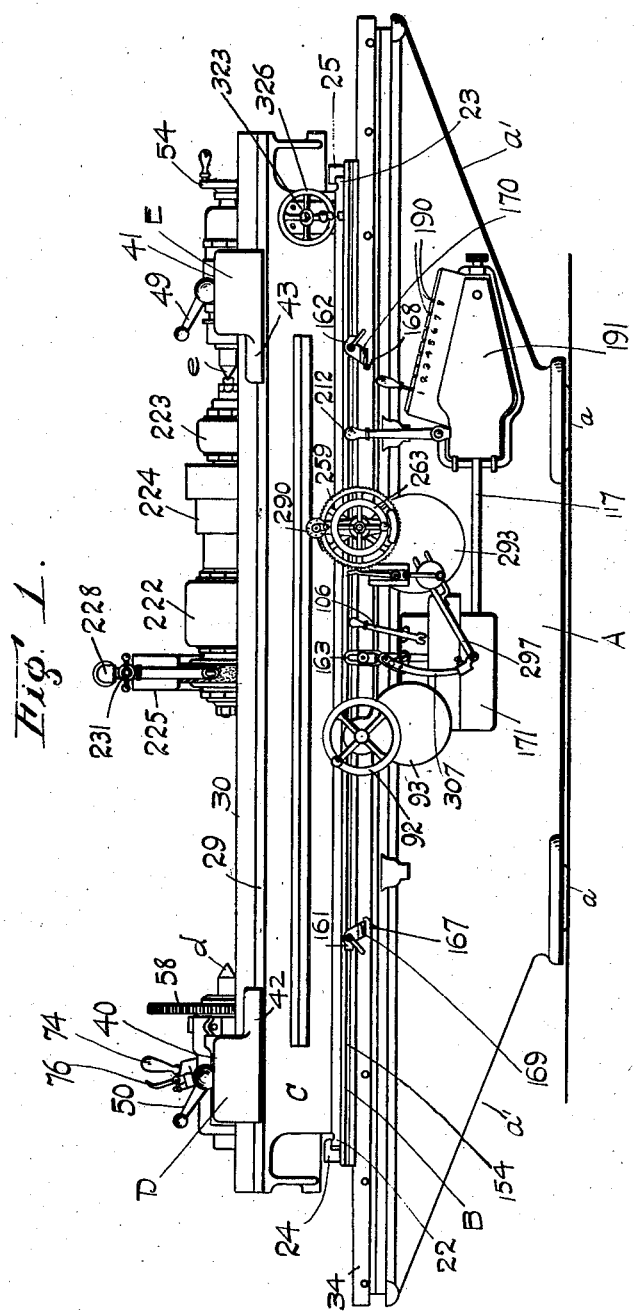

No. 762,838. PATENTED JUNE 14, 1904.
C. H. NORTON.
GRINDING MACHINE.
APPLICATION FILED FEB. 1, 1901.
NO MODEL. 9 SHEETS—SHEET 1.

Witnesses
Inventor.
Charles H. Norton
By Alden C. Higgins
Attorney.

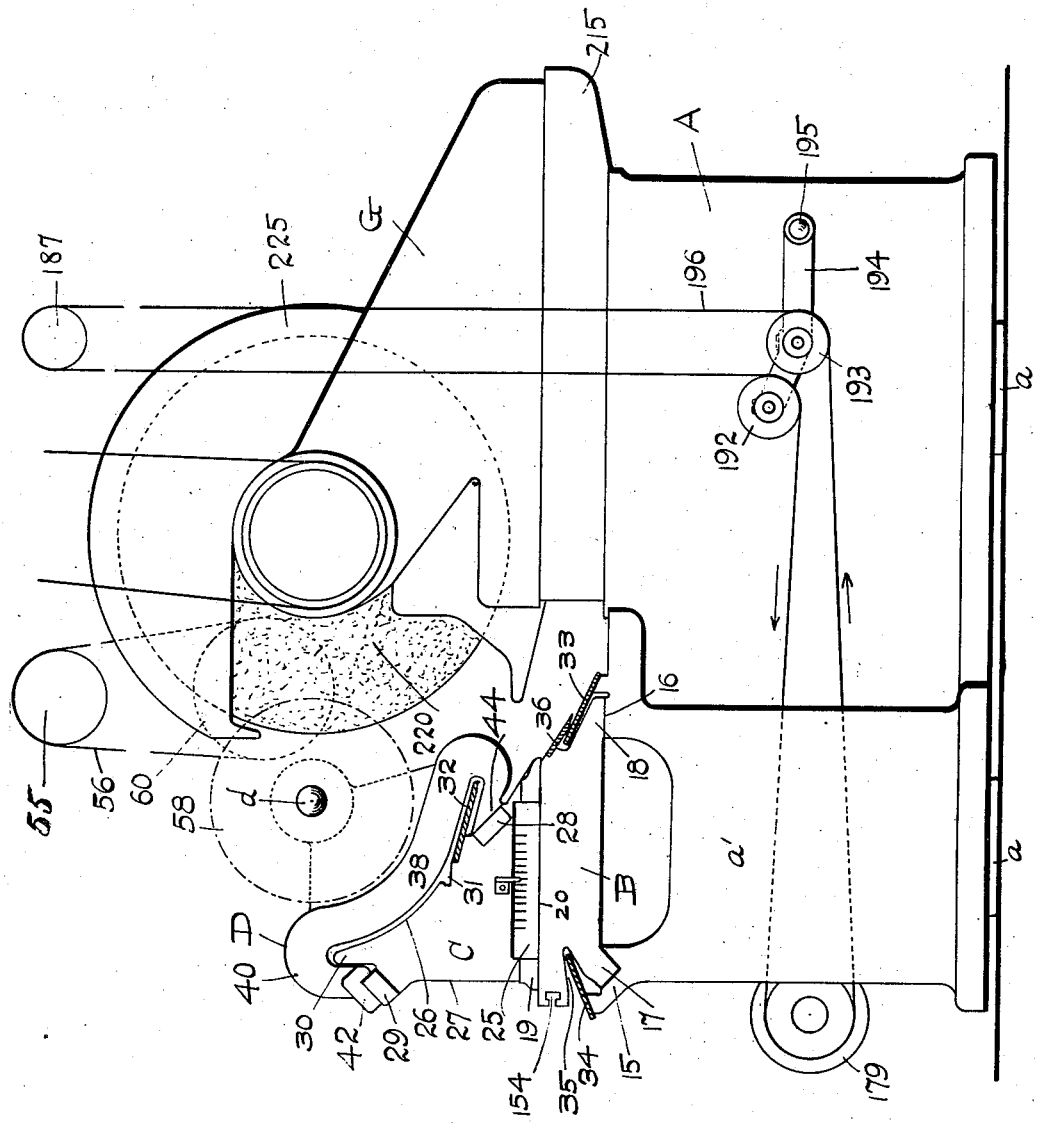

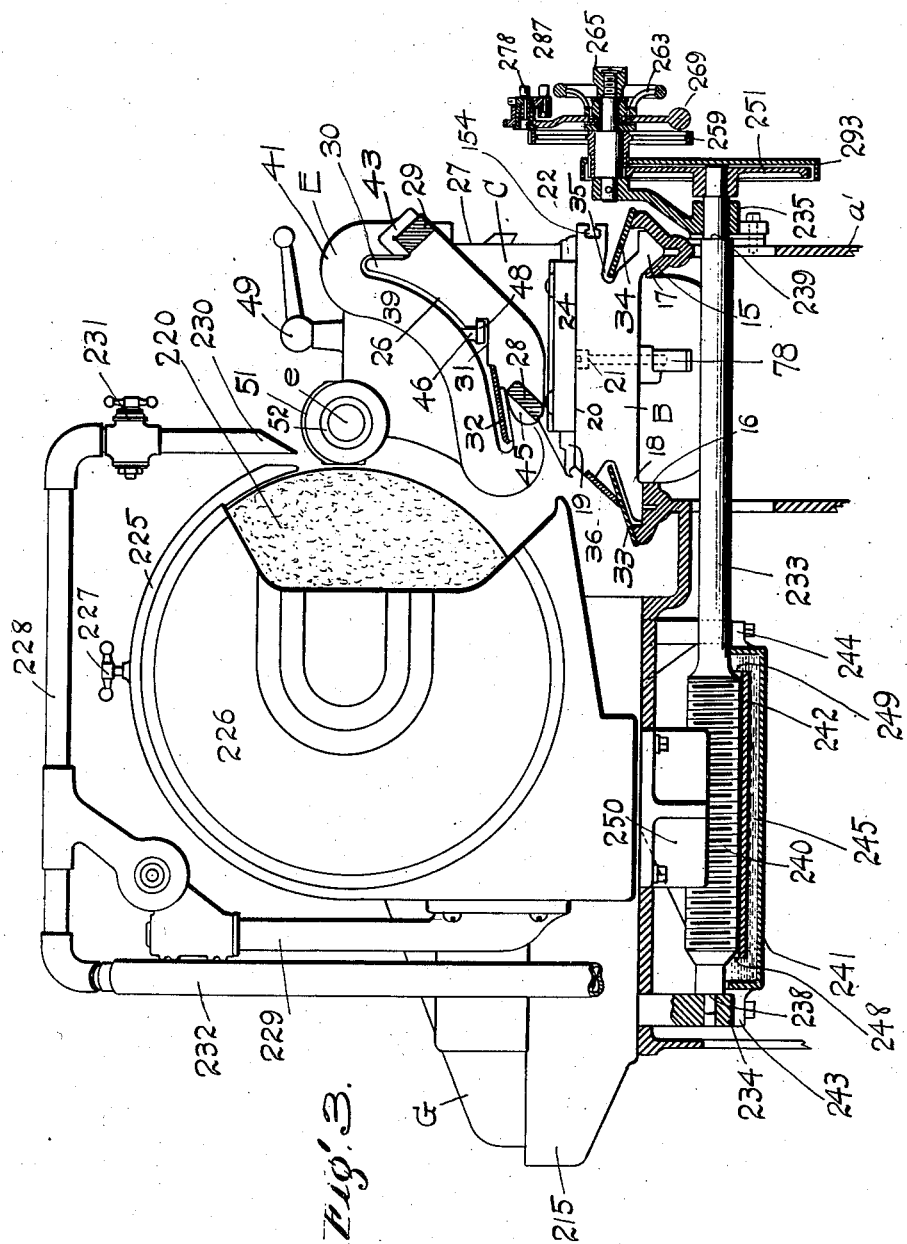

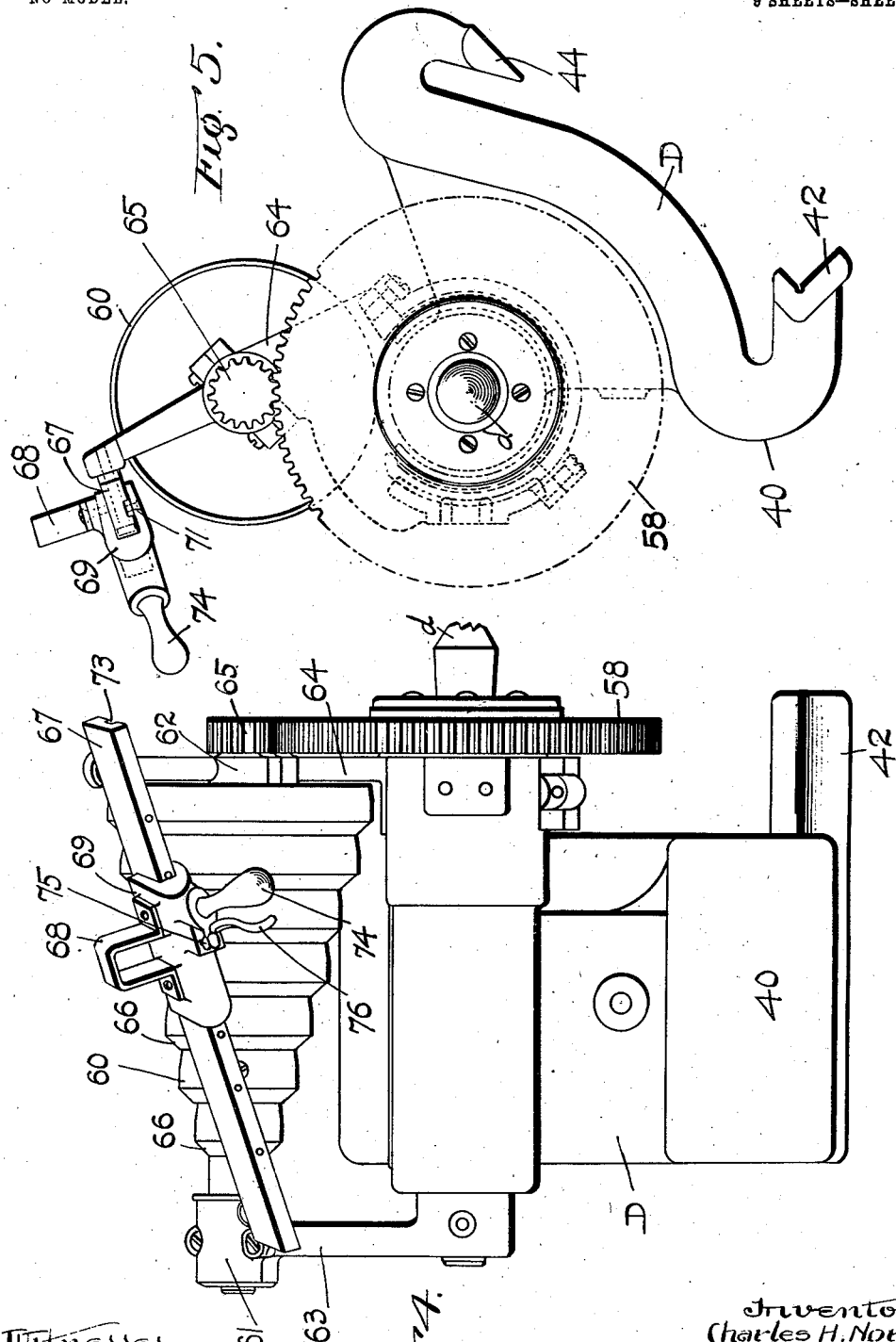

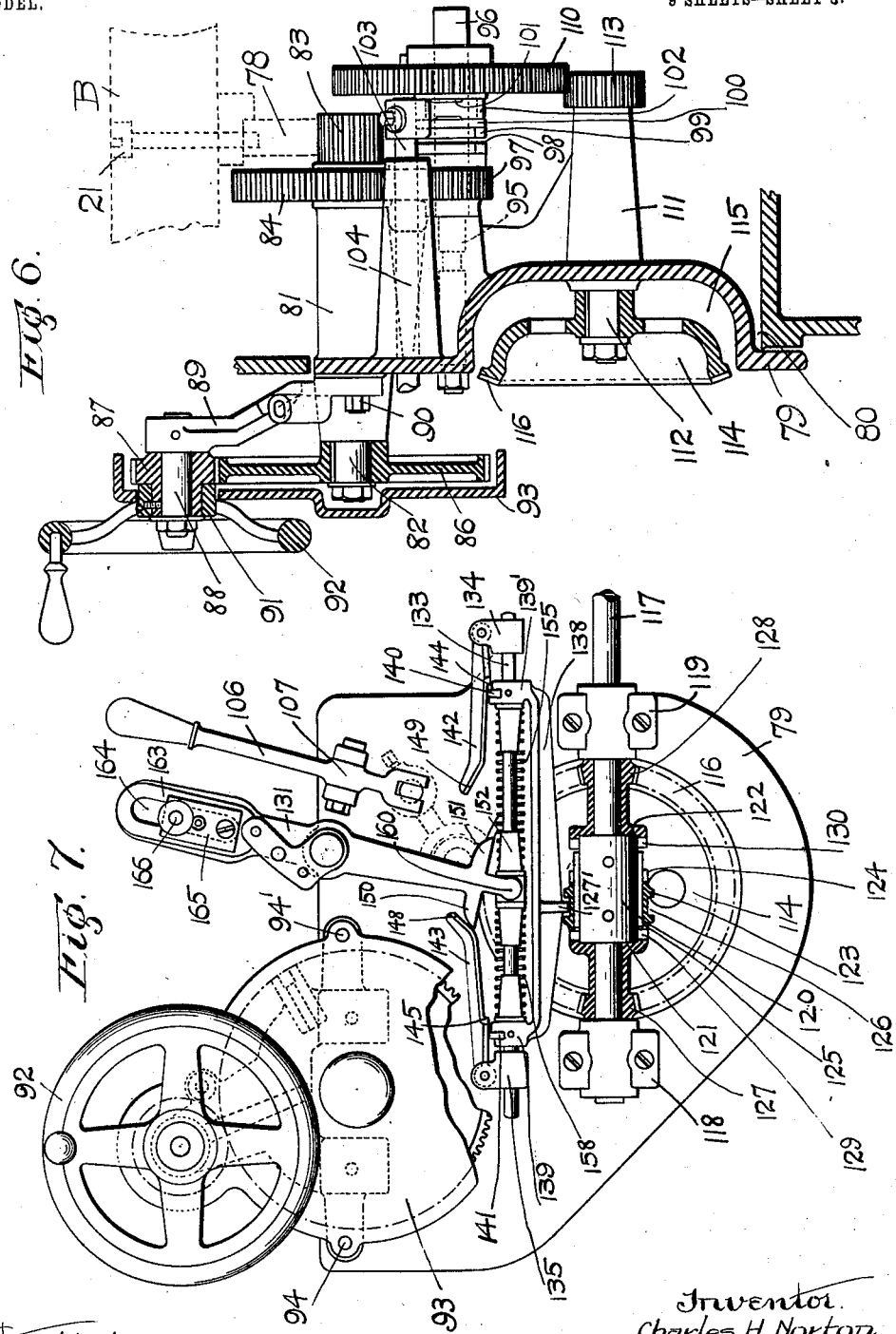

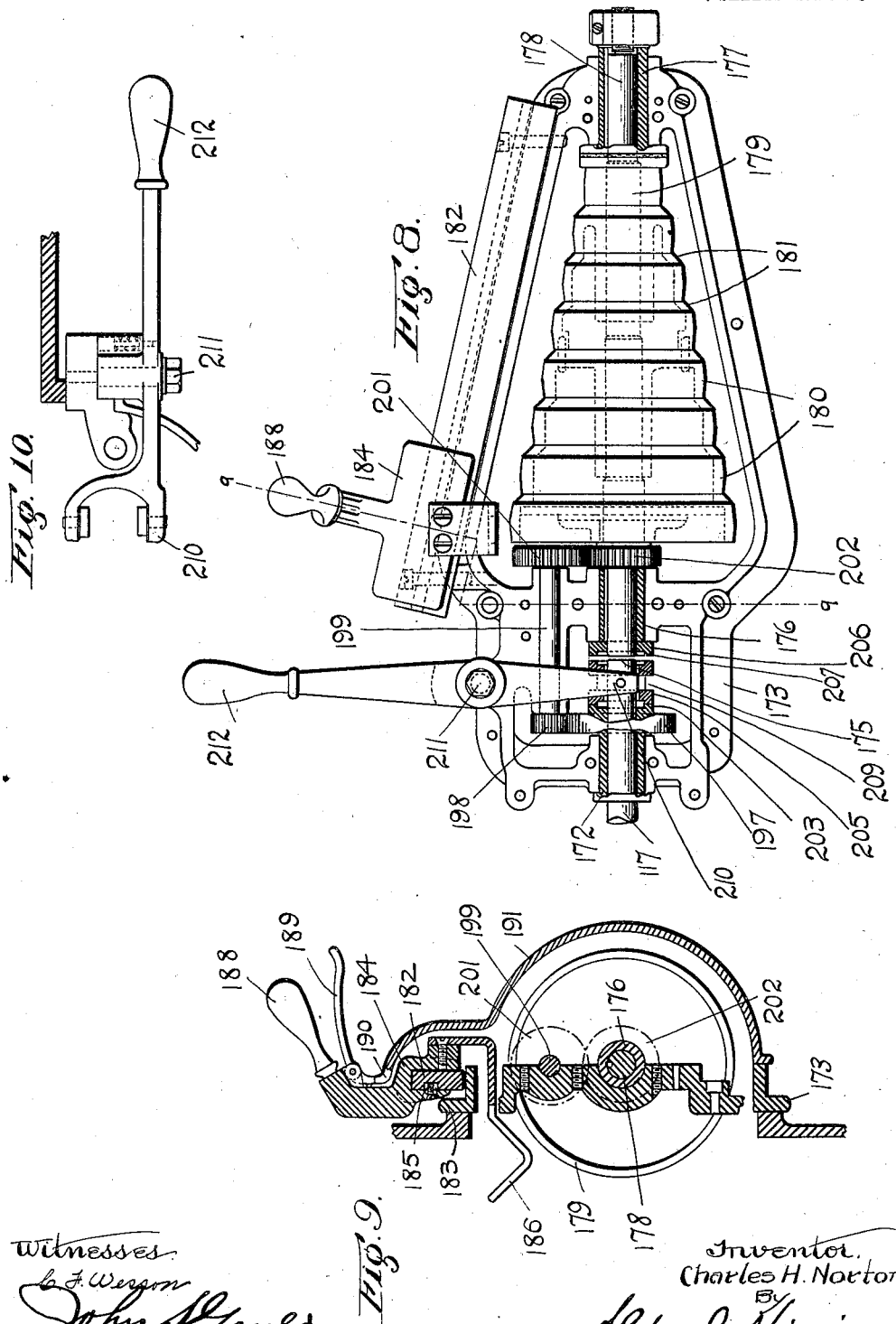

No. 762,838. PATENTED JUNE 14, 1904.
C. H. NORTON.
GRINDING MACHINE.
APPLICATION FILED FEB. 1, 1901.
NO MODEL. 9 SHEETS—SHEET 7.
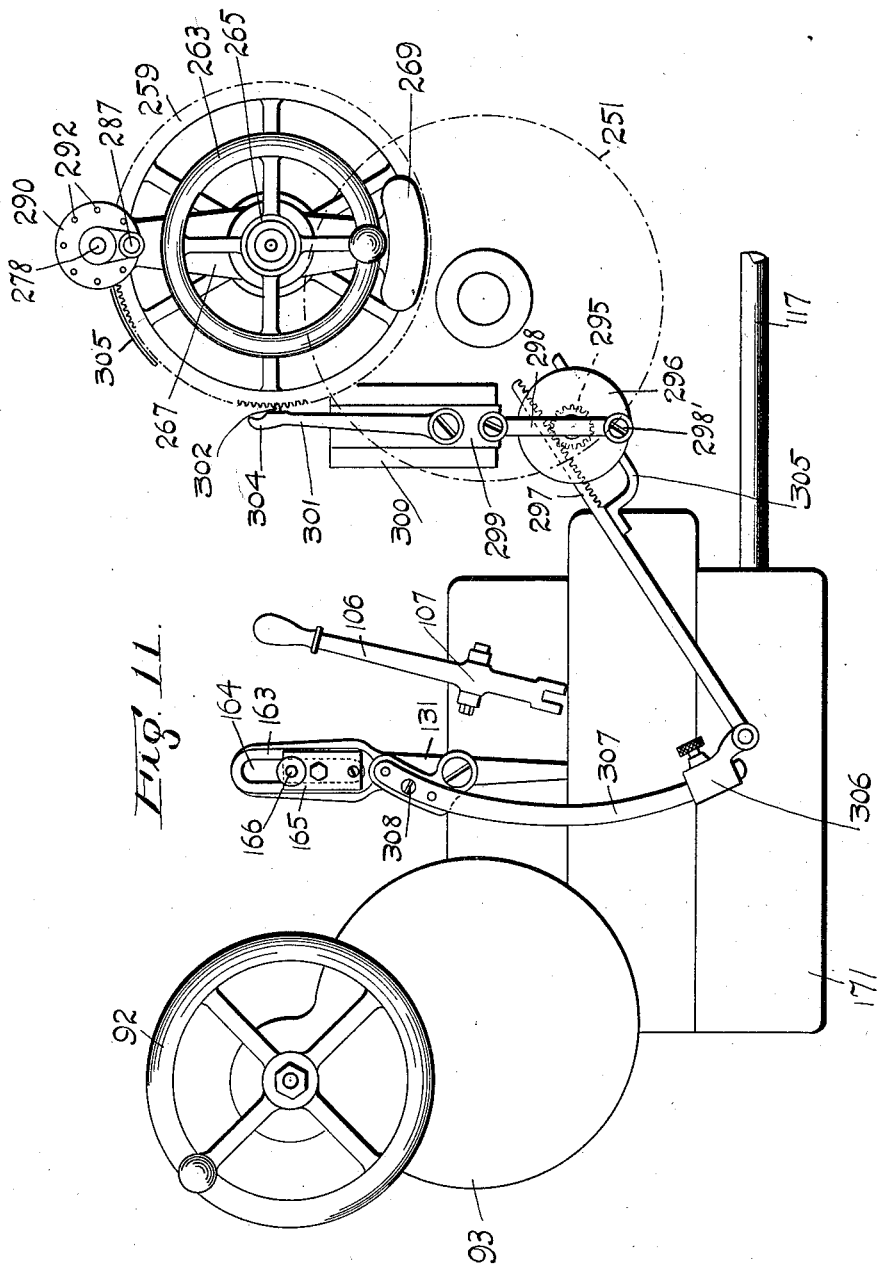
Witnesses:
Inventor.
Charles H. Norton.
By
Aldus C. Higgins.
Attorney.

No. 762,838. PATENTED JUNE 14, 1904.
C. H. NORTON.
GRINDING MACHINE.
APPLICATION FILED FEB. 1, 1901.
NO MODEL. 9 SHEETS—SHEET 8.
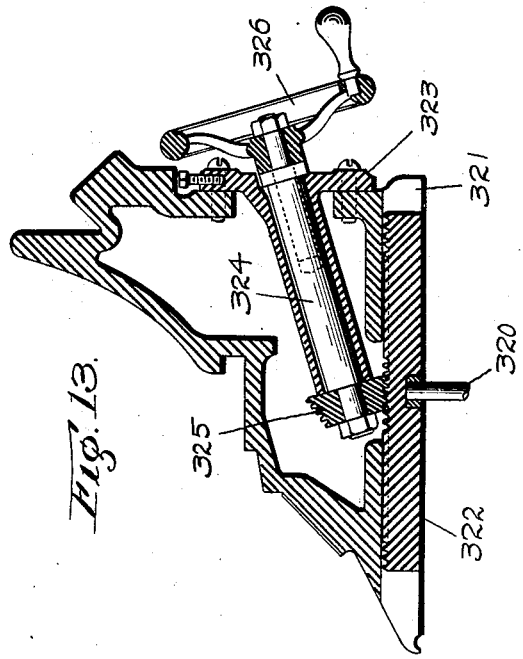
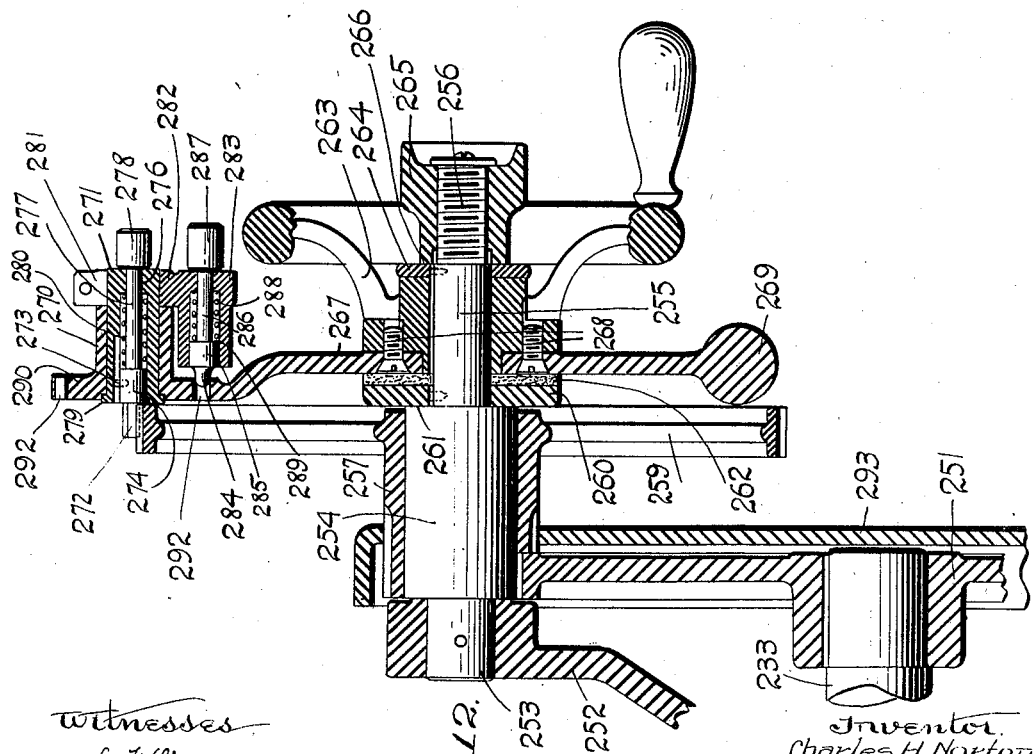

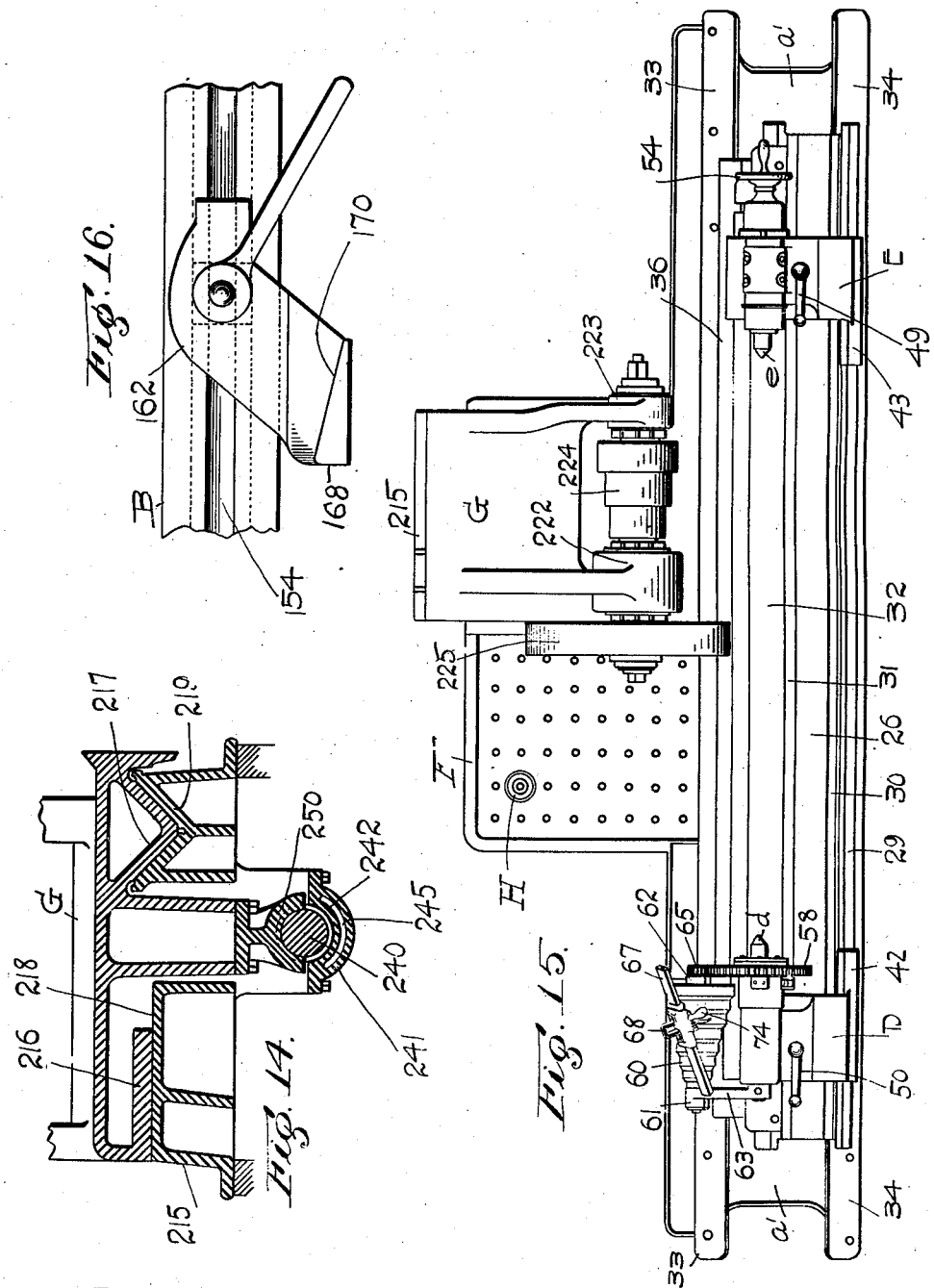

No. 762,838.

Patented June 14, 1904.

UNITED STATES PATENT OFFICE.

CHARLES H. NORTON, OF WORCESTER, MASSACHUSETTS, ASSIGNOR TO NORTON GRINDING COMPANY, OF WORCESTER, MASSACHUSETTS, A CORPORATION OF MASSACHUSETTS.

GRINDING-MACHINE.

SPECIFICATION forming part of Letters Patent No. 762,838, dated June 14, 1904.

Application filed February 1, 1901. Serial No. 45,651. (No model.)

*To all whom it may concern:*

Be it known that I, CHARLES H. NORTON, a citizen of the United States of America, and a resident of the city of Worcester, county of Worcester, State of Massachusetts, have invented certain new and useful Improvements in Grinding-Machines, of which the following is a specification.

My invention relates to grinding-machines adapted, primarily, for grinding straight, cylindrical, and taper work with minute accuracy. It embodies in its construction certain improved features by which are attained its chief objects—viz., great rigidity of parts, minute accuracy in grinding heavy work, simplicity and cheapness of construction, simplicity, ease, and convenience of operation, desirable adjustments, changes of speed in its moving parts, and automatic operation.

Still further desirable objects will be evident from the description which follows.

Several of the chief features of my invention may be briefly referred to as follows:

One feature consists in inclining the plane of the supporting-ways, also in the particular location of the supporting-ways on the table and in the construction of the table to form a permanent water-guard. Among other advantages this prevents any tendency to rocking, gives rigidity, and insures accuracy.

A further feature of my invention comprises the worm-and-rack mechanism mounted in the swivel-table, by means of which the latter may be turned on its pivot by the revolution of a hand-wheel. This contributes to ease and convenience of operation.

Other important features of my invention are the speed-change means for the work, speed-change means for the table, the arrangement and application of the speed-change means for the work and speed-change means for the table independent of each other. The speed change for the work is accomplished by means of the swinging speed-cone hung from the head-stock and geared to the head-stock gear. The belt, in the loop of which said cone hangs, runs over an overhead driving-drum and is easily shifted from one pulley-section of said cone to its adjacent section, up or down conical sections between said pulley-sections, and is held in the position to which it is adjusted by a slidable belt-guide.

Still further features of my invention consist in mounting the hand and automatic table-feed and automatic table-reversing mechanisms on a single plate fastened to the front of the machine, also in the construction of the automatic reversing and feed mechanism, and, further, in the slidable engaging pin for overriding the table-reversing dogs, avoiding moving said dogs when once set and preventing accident if the table is moved by hand beyond the limit of travel set by said dogs.

My invention further comprises the variable-table-speed mechanism mounted on the front of the machine and having the speed-cone with the conical sections between the pulley-sections, so that the belt may be pushed from one pulley-section to its adjacent one, and the belt guide and shifter.

My improvements in table-speed mechanism further include the back gearing in combination with said speed-cone and the swinging idler-pulleys, under which the belt runs to the speed-cone and which keeps it taut as it comes from an overhead drum.

Other features of my invention consist in the wheel-carriage-feed mechanism whereby the wheel-carriage is moved directly by the screw running in a bath of oil, which is engaged by the long half-nut fast to the carriage, also in the means for supporting said screw beneath said nut. By these means the screw is rigidly supported and is constantly well lubricated, both of which are essential to accuracy in operating.

The hand, automatic, and micrometer cross-feed mechanisms by which the feed-screw is operated are other important features of my improvement. These features consist in very simple and substantial mechanism. The hand cross-feed mechanism comprises an operating-wheel revoluble on a fixed pin and connected, through the micrometer mechanism, with a train of gears operating the feed-screw. The micrometer cross-feed mechanism consists in a micrometer-pinion engaging with one of the gears of said train and mounted to be fixed or revoluble with relation thereto, as desired, for micrometer or hand feed, respectively. The particular means whereby said micrometer-pinion is held in fixed relation to said train of gears or loosened, as desired, comprises a permanent connection with the hand-wheel and means for making the latter fast or loose on the shaft, as desired, for micrometer or hand feed, respectively.

Other features intended to be covered by this application are the means by which the micrometer-pinion is mounted to be withdrawn from connection with said gear or train of gears, the index having holes and the slidable index-pin connected with the pinion and adapted to fit said holes, which in this case are located one-eighth of a circumference apart and measure from hole to hole a carriage movement of one-eighth of one-thousandth of an inch.

The automatic cross-feed is another improvement which consists in a reciprocating pawl operating between the teeth of a gear connected with the cross-feed to revolve said gear one or more teeth at a time. Said pawl is reciprocated by pitman connection with a pinion oscillated by a rack connected adjustably to the table-reversing mechanism, whereby the automatic cross-feed is operated as the table is reversed at the end of each run. A particular feature of this part of my invention is the means for providing a fixed limit of movement of said pawl in one direction and a variable limit regulated by adjustment of said mechanism in the other direction.

There are several other features of my invention besides the chief ones above pointed out, which are described below and which I desire and intend to cover in this application and concerning which I have reference to the following description and the drawings filed herewith.

Figure 1 is a side elevation of the machine. Fig. 2 is an end elevation with the tail-stock left off. Fig. 3 is a view, partly in elevation and partly in section, the section through the base of the machine and the wheel-carriage-feed mechanism being taken on the axis of the feed-screw. Figs. 4 and 5 are top and end views, respectively, of the head-stock. Figs. 6 and 7 are sectional view and elevation, respectively, of the hand and automatic table-feed mechanism. Figs. 8 and 9 are elevation and sectional view, respectively, of the variable-speed mechanism of the table-feed. Fig. 10 is a detail view of the operating-handle for throwing in the back gears in said speed mechanism. Fig. 11 is an elevation of the automatic wheel-carriage feed and micrometer-feed. Fig. 12 is a sectional view through the micrometer and hand feed. Fig. 13 is a sectional view showing the mechanism for swinging the table on its swivel. Fig. 14 is a sectional view through the wheel-carriage and its feed-screw. Fig. 16 is a side view of one of the table-shifting dogs, and Fig. 15 is a top elevation of the machine.

The general form in plan view of the base A of the machine is that of the letter T. Said base is provided at its three extremities with supporting-legs $a\ a\ a$, on which the machine rests, thus providing a three-point or tripod support, which avoids rocking on an uneven foundation and is solid and steady. Integral with the base and located adjacent to that portion of the same over which the wheel-carriage is supported is the water-tank F. Its location is such that it directly catches the water which is delivered upon and falls from the work, grinding-wheel, platen, and swivel-table, thus avoiding the use of return pipes and channels, which are liable to become clogged. The tank is provided with the perforated cover, through which the rotary pump H is mounted, which is run from an overhead countershaft. (Not shown.) The base A is hollow and interiorly braced with integral webs or trusses, (not shown,) as is usual in large base-castings. The portion $a'$ of the base which corresponds to the horizontal portion of the T is provided on its top with longitudinal horizontal slideways 15 16, the bearing-surface of the way 15 being angular and that of the way 16 flat. Slidably mounted longitudinally on and guided by the said ways is the sliding flat-top bed or platen B, having slides 17-18 adapted to fit said ways. The platen is operated along the base to carry the work across the face of the grinding-wheel by mechanism described below. The swivel-table C, having a flat base resting on the flat horizontal surface 20 of the platen, is swiveled thereto near its middle point on the swivel pin or pivot 21. The ends of said swivel-table are provided with the integral slides 22 23, fitting under transverse ways 24 25, respectively, provided on the sliding bed near the ends thereof. This swivel-table carries the head-stock D and the tail-stock E, having the centers $d\ e$, on which the work is mounted. Said table C can be swung around the pivot or swivel pin on the platen B to place the axis of the work parallel with or at an angle to the direction of movement of the platen on its ways, thus providing for parallel and taper grinding. The means for swinging said table on the swivel-pin is described as follows, Fig. 13: The table, near one end thereof, is provided with the transverse channel or groove 321 on its under side. Fitting in said groove is the worm-rack 322, which is pivoted on the pivot 320 in said platen. Journaled to the plate 323, which is firmly fastened to the table, and extending downward into the interior of said table is the worm-shaft 324, having the worm-wheel 325 meshing with said worm-rack and on the other end the hand-wheel 326. Thus it will be seen that the table can be swung on its pivot by means of the worm working in said rack. In transverse section the swivel-table C is made solid and substantially triangular in form, providing in itself a permanent water-guard on its face 26 in front of the grinding-wheel. The base 19 of said table, forming one side of the triangular section, is made broad and extends under the work, where it forms an apex with the second slanting side 26, which serves as the permanent water-guard. Said slanting side rises on an angle with said base to a point approaching the line of the axis of the work and grinding-wheel. The third side 27 is substantially vertical from the top of said slanting side to said base. Thus a solid table and support for the head and tail stocks and steady or bearing blocks which may be attached thereto is provided, making a solid and substantial support, which is necessary in accurate grinding.

The direct work-support or holding devices—viz., the head-stock D and tail-stock E—are carried by the triangular swivel-table on the supporting-ways 28 29. The plane of these supporting-ways is inclined to the horizontal in front of and beneath the grinding-wheel. Said plane is also inclined to the plane of the wheel-slide 218. Thus the plane of the support of the head and tail stocks is more nearly normal to the direction of the force applied by the wheel to the work than would be the case were said plane horizontal, as is common. While this is shown as applied to the supporting-ways of the head and tail stocks on the table, it is evident that this can be applied to the other horizontal ways for the same purpose, and my invention covers such application.

My invention is not confined to a reciprocating platen or table, as said table might be made stationary and the wheel-support reciprocated without departing from the spirit or scope of my invention.

The way 28 is formed, as a flat slideway is located, near the base of the swivel-table substantially beneath the work. The way 29 is made angular in cross-section and located at the upper part of the table behind the water-guard extension 30, forming a part of the table itself. This extension 30 protects the supporting-way 29 from water used on the wheel. The widely-separated supports for head and tail stocks, one of which is placed near the base of the table, gives steadiness and accurate alinement of the centers. The slanting side 26 of the table provides a natural water-guard. This side is preferably made concave between the way 28 and the guard extension 30 and is provided about midway with the longitudinal groove 31, having a shoulder to receive the clamping-bolts of the head and tail stocks for securing the same in position upon the supporting-ways. This clamping means located between the separated supporting-ways will allow the clamping-pressure to vary without affecting the accurate alinement of the centers.

It is obviously desirable that the slideways and bearings of the machine should be protected from water and dirt. To effect such protection, there is provided by the table and its extension 30, protecting the supporting-way 29, the water-guard 32, extending well over the supporting-way 28. The guard 33 extends over the slideway 16, and the guard 34 extends into the recess 35 over the slideway 15. Said guards 33 and 34 are attached to and extend longitudinally along the base. Extending over the guard 33 and attached to the platen B for the length of the same is the guard 36. These overlapping guards and portions of the platen and table effectively protect the ways. The bases 38 39 of the head-stock and tail-stock, respectively, are similar in form and conform, substantially, to the shape of the slanting front or concave side of the swivel-table. The upper parts 40 41 of said bases extend over the water-guard extension at the top of the swivel-table and downward, where they are provided with the angular slides 42 43, adapted to fit and travel on the supporting-way 29. The lower portions of said bases are extended over the lower water-guard 32 and back under the same, where they are provided with the slides 44 45, adapted to be supported and to travel on the supporting-way 28. The head-stock and tail-stock clamping-bolts, (shown on Fig. 3 on tail-stock only,) as 46, having similar heads, as 48, fitting into the groove 31, are provided at the top within easy reach of the operator with the handle-nuts 49 50, which serve to draw the bolt-heads fast against the shoulder of the groove 31, thus holding said stocks in position. The tail-stock is provided with the tail-spindle bearing 51, having the usual sliding spindle 52, screw, (not shown,) center $e$, and operating-wheel 54, and in other respects having the well-known construction. The head-stock is provided with a driving gear-wheel 58, mounted on a horizontal stud having the center $d$ and suitable means (not shown) for engaging a clamp or dog, which is fastened to the work to revolve the same. A speed-cone 60 is journaled in the bearings 61 62, said bearings being mounted on arms 63 64, journaled suitably to the head-stock, the arm 63 having the bearing 61 preferably journaled on an extension of the spindle and the arm 64 having the bearing 62 preferably journaled on a portion of the head-stock. Said cone is provided with the small gear-wheel 65, meshing with the gear-wheel 58. In this case said cone is provided with eight steps or pulleys for the driving-belt 56 and has located between each step or pulley and integral therewith conical sections 66 66 in order that the belt may ride up or down said conical extensions easily when it is shifted to change the speed. A belt-shift slideway 67 is suitably rigidly mounted from the bearings of the cone in such a position in relation thereto that the belt runs freely in the belt-guide 68 whatever portion of the cone the belt may be guided to and running on. The belt-shifter comprises the slidable block 69, having the belt-guide 68 mounted on one side thereof and provided with a gib 71, operating in the longitudinal groove 73 on said slide. It is also provided with a handle 74 for operating the same and the spring-operated holding-pin 75, fitting into holes on top of said slide to hold the said belt-shifter in its successive positions, said pin being adapted to be drawn from the holes by the handle 76, connected therewith. A long drum 55 of a length equal to the longest run of the carriage is mounted on a counter-shaft over the head-stock speed-cone just described. The driving-belt 56 encircles said drum and cone and is of such a length that the head-stock speed-cone rests in its loop as in a sling, its weight being such as to cause sufficient friction between said cone and belt to drive the head-stock spindle. Thus as the belt is shifted from step to step it is kept taut by the weight of the cone, and as the carriage is fed along the belt travels on the overhead drum. By raising the cone out of operative contact with the belt the rotation of the work may be stopped without stopping the table-feed or any other operation of the machine or overhead work.

By the means above described all changes of speed throughout the whole range of speeds are effected at the machine and not dependent on overhead cones or on the speed of the work-driving shaft. The speed of the work-driving belt will be the same whether the work is running on the high speed or the low speed. Moreover, the speed of the overhead drum will be the same for any work speed, and this is designed to be such that with the fastest table travel the belt rides along it easily. Thus the speed of the work is entirely independent of the speed of the table.

The table drive or feed mechanism by which the table is fed forward and backward, carrying the work across the face of the grinding-wheel, is described as follows: Referring to Figs. 3 and 6, the flat sliding table or platen is provided near the middle of its under side with the longitudinally-extending rack 78, suitably fastened thereto. The table-feed or platen-driving mechanism is mounted on the plate 79. The front of the base of the machine is provided with an opening 80, through which said driving mechanism extends from the front of the machine. This mechanism consists of a train of gears connected with a platen drive-shaft and also of mechanism for disconnecting the same and using hand-feed. The automatic reversing mechanism for automatically reversing the platen-feed consists of a reversing-lever to be engaged by dogs on the platen clutch mechanism on said drive-shaft and intermediate spring shifting mechanism. One feature of my invention consists in arranging and assembling the platen-driving mechanism and automatic reversing mechanism on one plate mounted on the front of the base of the machine, thus simplifying the construction, saving much expenditure of time and labor and consequent expense in manufacture, and assembling the parts where they are easily accessible. Referring again to Figs. 6 and 7, said platen-driving mechanism is mounted on the supporting-plate 75, which fits on over the opening 80 and holds said mechanism in place. Integral with said plate is formed the journal-bearing 81, the shaft 82 of which carries fast on its inner end beneath the sliding table the pinion 83, which meshes into the rack 78. This shaft is provided with the gear-wheel 84, also mounted fast thereon, which meshes with the gearing of the automatic table-driving mechanism.

On the outer end of the shaft 82 a gear-wheel 86 is keyed, into which the pinion 87 meshes. Said pinion 87 is revolubly mounted on the bearing 88, fixed in the arm 89, which is held to plate 79 by the bolts 90. Said pinion 87 is formed with a sleeve 91, on which is mounted fast thereto the hand-wheel 92, by means of which the sliding table can be driven back and forth when the automatic feed is disengaged. Said gears 86 and 87 are covered and protected by the gear-cover 93, fastened to the plate at 94 94'. Said plate 79 is provided with a journal-bearing 95 below the said bearing 81, having the shaft 96. The small gear 97 is revolubly mounted on said shaft and is provided on its face with the clutch member 98, fitting a similar clutch member 99 on the collar 100, which is keyed to said shaft, but capable of longitudinal movement thereon. Said collar is furnished with the annular groove 101, into which the bifurcated shifting dog 102 engages. Said shifting dog is mounted on the shaft 103, slidable in the bearing 104, which is integral with the plate. Said shaft extends outside said plate and is engaged by the lever 106, fulcrumed on said plate at 107 and having a handle to operate the same. Thus the clutch-collar 100 can be thrown in of out of engagement with the clutch member 99 on the gear 97, making said gear fast or loose, respectively, on the shaft, as desired. Mounted fast on said shaft 96 beside the collar 100 is the gear-wheel 110, by which said shaft is driven. Journaled in the bearings 111, formed integral with said plate, is the shaft 112, on the inner end of which is mounted fast thereto the gear-wheel or pinion 113. On the outer end of said shaft is keyed the bevel-gear 114, cup-shaped in order that the hub and shaft-nut may not be in position which would interfere with the reversing mechanism. Said gear is set into a cup-shaped depression 115 in the plate 79, so that the gear-teeth 116 may be located near the face of said plate.

The feed drive-shaft 117 is mounted in the journal-bearings 118 119. Said journal-bearings are mounted horizontally on the plate 79 at diametrically opposite sides of the depression 115, so that the drive-shaft runs horizontally over the center of the gear 114. Said shaft is provided over the center of the gear with the enlarged portion or barrel 120, which provides the annular shoulders 121 122. The clutch-collar 123 is keyed to said shaft, revolving with the same, but is capable of longitudinal movement thereon. Said collar is provided with the toothed clutch members 124 125 and the annular groove 126 into which the bifurcated arm 127' of the shifting mechanism extends. Journaled on said shaft and fitting between the respective shoulders 121 122 and the respective journal-bearings 118 119 are bevel-gears 127 128, engaging with the gear 114 on opposite sides of its center. Said gears are provided, respectively, with the integral toothed clutch members 129 130, extending over the edge of the barrel. The drive-shaft revolves in one direction only, and the clutch-collar is adapted to alternately engage, respectively, with the gears 127 128 to revolve the gear 114 in one direction or the other, respectively. The clutch-collar is adapted to be shifted by the movement of the platen and reversing-lever 131. In case said clutch-collar was attached directly to said reversing-lever the momentum of the platen would not be sufficient after one pair of clutch members was disengaged to move the collar to engage the other pair of clutch members to reverse the platen. To effect this reversal, a spring-actuated shifting mechanism is located between said reversing-lever and the clutch-collar, which locks the collar alternately against movement in each direction, respectively, then compresses a spring to actuate the collar against its respective locking-catch when the spring operates to throw said clutch-collar, effecting a reversal of the movement of the platen. This means for automatically shifting said clutch-collar and changing the direction of the table-feed comprises the following detail mechanism attached to the plate 79: A slidable rod or plunger 133 is horizontally mounted over the drive-shaft 117 to slide in the bearings 134 135 on said plate. The bifurcated arm 127', engaging the annular groove 126 in the clutch-collar, is mounted fast on the slidable shaft 133 by means of the clutch or bridge connection 138, integral with the hubs 139-139', which are mounted fast to said shaft. These hubs are respectively provided with the hardened catch-lugs 140 141, adapted to be engaged by the locking-catches 142 143, having the engaging shoulders 144 145, respectively, and hinged, respectively, to the slide-bearings 134 135. These catches are also provided with the cam-faces 148 149, respectively, to be engaged by the cam-shoes 150 151 on the reversing-lever 131. A spring compression-collar 152 is slidably mounted on said rod 133. Between said collar and the hub 139' and around the rod 133 is mounted a spiral compression-spring 155. On the other side of said collar between the same and the hub 139 is mounted the similar compression-spring 158. Said springs act against each other and hold the collar in its intermediate position on the rod. By these means when the clutch-collar is thrown into engagement with one clutch member—as, for instance, 129—the locking-catch corresponding with that position of the clutch-collar engages behind the engaging shoulder, as 144, so that the said collar cannot be shifted until the catch, as 142, is tripped by the cam-shoe 151. A similar operation takes place in relation to engagement with the clutch member 130 and the catch 143.

Below the cam-shoes 150 151 the bifurcated arm 160 extends from the lever into engagement with the annular groove in the collar 152. As said bifurcated arm of said lever moves the collar in one direction or the other the spring against which the latter is moved is compressed between it and its respective hub, said hub, and its connected elements, the bridge and bifurcated arm, engaging the sliding clutch-collar being held against the action of said spring by the locking-catch engaging the locking-shoulder on said hub. When the spring has been compressed a certain distance, the tripping cam-shoe comes into engagement with the cam-face of the locking-catch and releases it. The spring which has been compressed then acts to throw the rod and its connected mechanism with said clutch-collar, which is thus positively and instantaneously shifted, reversing the direction of the platen or table feed. Said reversing-lever is thrown at either end of the table run by being brought into engagement at its upper end with the reversing-blocks or dogs 161 162, fastened to the platen in the groove 154, along which they may be adjusted and held by suitable clamping mechanism to regulate the length of the table run. The upper end 163 of the reversing-lever is provided with the slotted slideway 164. The slidable block 165, having the engaging pin 166 extending through and into the path of the reversing-dogs, is suitably held to slide in the slotted way. Said reversing-dogs are provided with the engaging faces 167 168 to engage said pin. The engagement of these faces with the pin shifts the lever, compresses the spring on the side that is locked, trips the lock, and shifts the clutch-collar. If, however, it is desired to move the table back and forth by hand without limiting its movement to the distance between the dogs, the engaging pin 166 in the sliding block will come into contact with the cam-face of either dog, and if moved farther than required to compress the spring, unlock the catch, and accomplish the shifting the pin-block will slide up the slotted way and ride over said dogs. The said dogs are provided with the faces 169 170 on the outside, so that the pin and slidable block may ride over them from the outside without affecting the shifting mechanism in any respect. Thus I attain the obvious advantage of being able to move the carriage after the dogs are set without changing their position or manipulating the sliding pin on the reversing-lever and which normally stands in the path of said dogs. It will be seen that the reversing mechanism is liable to no undue strain owing to the movement of the carriage, and if by any possibility the machine should be started when the engaging pin is outside the space between the blocks after having overridden one of them the shifting mechanism will have been so set by its operation immediately preceding its overriding that the automatic feed will bring the table back where the pin will again be between the blocks. Thus possibility of accident from a wrongly-set table feed is reduced to the minimum. The table-feed and reversing mechanism above described is covered by the cast-iron casing 171, Fig. 1, protecting it from dust and dirt. Said table-feed mechanism is driven through the shaft 117 by means of the variable-speed mechanism described as follows: the shaft 117 is journaled in the bearing 172 on the frame 173. Said frame is constructed to be fastened to the front of the base of the machine around an opening into which the speed-cone extends laterally. The shaft ends at 175. Directly on a line with said bearing and journaled in the frame at 176 and 177 is the speed-cone shaft 178, on which the hollow speed-cone 179 is rigidly mounted. Said cone is provided with eight steps or pulley-sections 180 180, &c., between which are the conical sections 181 181, &c., up and down which the belt may be easily shifted. Over the said cone a belt-shifter slideway 182 is provided and suitably fastened at each end to the frame 176 and having the longitudinal groove 183. On this way is slidably mounted the shifting block 184, having the gib 185, operating in the longitudinal groove 183 in said slideway. Fastened to the front of said block and extending back within the base is the belt-guide 186, having the fork embracing the belt. Said shifting block is provided with operating-handle 188 and an ordinary spring holding-catch 189, fitting into successive notches 190 in the cover-plate 191. Said cover-plate extends over the said speed mechanism and protects the same from dirt and dust.

The belt 196, which runs to the speed-cone, is driven from a counter-shaft pulley or drum 187 and extends under idler-pulleys through the opening at the back of the base and around said speed-cone, as shown in Fig. 2. The idler-pulleys 192 193 are mounted on the arm 194, which is swung from the base at 195, and are of such weight that they act by gravity to keep the belt 196 taut in all positions of the same on said speed-cone.

It will be noted that the change of speed of the table is effected entirely at the machine and is not dependent on overhead cones or on the change of speed of the driving-shaft. The speed of the table-driving belt remains the same for every speed of the table. Furthermore, when the speed of the work is changed the speed of the table is not affected, and any of the table speeds can be used whatever the revolution of the work may be or any of the work speeds used without changing the reciprocating or table speeds.

The speed-cone is connected to the platen drive-shaft directly by clutch means or through back gearing, which reduces the speed. The shaft is extended between the bearings 172 and 176 and carries the gear-wheel 197, revoluble thereon. This gear meshes with the gear-wheel 198, mounted fast on the shaft 199, which is journaled in the frame 173. On the opposite end of said shaft is rigidly mounted the gear-wheel 201, which in turn meshes with the gear 202, fast to the shaft 178 of the speed-cone. The gear 197 is provided with the clutch-teeth 203 on the inside face thereof, adapted to engage similar clutch-teeth on the clutch-collar 205, which is keyed on said shaft and slidable thereon. A clutch member 206, having teeth 207, is made fast to the shaft of the speed-cone, and the clutch-collar 205 is provided on its adjacent face with corresponding clutch-teeth to engage the same. Said clutch-collar is provided with the annular groove 209, into which the bifurcated end of the clutch-lever 210 extends. Said lever is fulcrumed at 211 to the frame and has the conveniently-located operating-handle 212. Thus by means of the mechanism just described the shaft 117 may be thrown into rigid revoluble engagement with the shaft of the speed-cone, it being disengaged in such case from the back gearing, or said drive-shaft may be thrown into revoluble engagement with the back gearing, in which case the shafts are disconnected. Thus a rapid table speed can be had when roughing to remove stock rapidly. For finishing with the same grinding-wheel without stopping the work or table the lever 212 is shifted, which throws in the back gearing, thus instantly reducing the table speed suitable for the finishing cut.

The grinding-wheel carriage G is mounted on the wheel-slide or slideway-base 215, fastened to the top of the base A on that part corresponding to the vertical portion of the T, and is provided for movement on said base 215 at right angles to the movement of the sliding table with the flat and angular slides 216 217, respectively. Said slides fit corresponding integral slideways 218 219 in the top of the base 215. The grinding-wheel 220 is mounted on a spindle, which has the journal-bearings 222 223 integral with the carriage. A driving-belt pulley 224 is fixed to the spindle between said bearings. A wheel-guard 225 is permanently attached to the carriage and is provided with the removable side 226, held in place by the catch 227. The iron water-pipe 228 is mounted above the wheel by means of the arm 229, attached to the wheel-guard. It delivers water through a nozzle 230 directly on the work at the point of contact with the grinding-wheel and is provided with the valve 231 to regulate the flow. A flexible hose-pipe 232 is attached to the iron water-pipe and runs to the pump, which may be of any well-known construction, though preferably of the rotary-fan style. Said pump is driven in any suitable way and is placed in the tank, which is integral with the base and located beneath and at the side of the grinding-wheel.

The wheel-carriage feed-screw rod 233 is journaled to the base parallel with the slideways of said carriage by means of the bearing 234 at back of the machine and beneath the carriage and the bearing 235, fastened to the inside and front of the base, and is provided at the back end with the shoulder 238, which may take the end thrust against the bearing 234, and at its front end with the shoulder 239, to which the bearing 235 may be adjusted to take end thrust in the opposite direction.

Besides the supports for the screw-rod provided by the journal-bearings just described the enlarged threaded portion 240 thereof is supported by the cradle-bearing 241. Said cradle-bearing is provided with the circular peripheral bearing trough or cradle 242, in which the screw, the thread of which is cut square, rests and revolves. Said bearing 241 is supported by attachment to the base at 243 and 244. In order to provide proper lubrication for this bearing, an oil-trough 245 is provided beneath the bearing and integral therewith. It is closed at the sides and open at the ends 248 249. The oil stands in this trough at a level higher than the lowest point in the periphery of the feed-screw. When the screw is revolved, the oil is fed along by the threads on the principle of the well-known Archimedes pump, keeping up a circulation of oil on the bearing in one direction and in the trough beneath the bearing in the opposite direction.

The screw is threaded to the wheel-carriage by means of the long half nut or block 250, bolted thereto. Said block is made circularly concave to fit the screw and is provided with similar threads to operatively engage with said screw.

The feed-screw mechanism providing hand, automatic, and micrometer cross-feed, by which the wheel-carriage, and thus the wheel, is moved with minute accuracy and positiveness, is described as follows: The gear-wheel 251 is fixed on the end of the screw-shaft 233. Extending from the journal-bearing 235 is the arm 252, in which is fixed the bearing pin or spindle 253, comprising the cylindrical bearing 254, the reduced cylindrical bearing 255, and the screw-threaded end 256. A small gear 257, having the teeth meshing with the teeth of the gear 251, is mounted on the cylindrical bearing 254. Said gear has the extended hub forming the hub of a large gear 259. A fixed washer 260 is suitably mounted fast on the reduced cylindrical bearing 255 of said spindle, adjacent to the shoulder 261, formed between the bearing portions 254 and 255. Adjacent to said fixed washer is the loose leather friction-washer 262, and adjacent to the latter is the hub of the hand-wheel 263, which is revolubly mounted on said reduced portion of said spindle, and the washer 264, suitably mounted to slide but not to revolve on said spindle. The knurled set-nut 265 is threaded on the end 256 of the spindle and is adapted to have its annular shoulder 266 screwed up against the washer 264, pressing the hub of the wheel 263 between it and the fixed washer 260 and friction-washer 262, holding the same fast to the shaft, which is rigid with relation to the base. When said nut is loosened, said hand-wheel may be revolved on the shaft.

The index mechanism is mounted on the arm 267, rigidly fixed by means of the screws 268 to the hand-wheel 263. Said mechanism is balanced by the oppositely-extending weighted arm 269. Said arm is provided with the bearing 270, in which the revoluble barrel 271 is journaled. Within this barrel is located shank 277 of the slidable pinion 272, the teeth of which mesh with the teeth of the gear 259. Said pinion is held from revolving in said barrel by a pin 273, fixed in the enlarged hub 274 of the pinion 272 and slidable in a longitudinal slot on the inside periphery of the barrel. Extending from said hub through said barrel and having a slidable bearing 276 through the end of the sleeve is the shank 277, having a knurled handle or thumb-piece 278, by which the pinion 272 may be withdrawn from engagement with the gear 259 and placed in any circumferential position around said gear, preferably at the top, for the convenience of operating and for throwing out the automatic feed as described below. A spring 280 normally holds said pinion in engagement with the gear 259. Said barrel is provided on one end with the shoulder 279, which bears against the face of the bearing 270, and at the other end carries the split collar 281, made fast to said barrel against bearing 270. Said collar is provided with the extending arm 282, having the integral hollow casing 283, carrying the slidable index-pin 284. Said index-pin is provided with the bearing 285, fitting the interior of the casing 283, and the smaller integral pin-rod 286, slidable through the end of said casing and having the handle or thumb-piece 287. A compression-spring 288 is located between the shoulder 289 of the pin-rod and the inside end of the casing and acts to force the index-pin 284 into the holes of the index 290. The index 290 is integral with the arm 267, the holes 292 being located in a circle around the axis of the pinion. Said holes in the particular device described are eight in number, and the movement of the index-pin from one hole to another makes a wheel-carriage movement of one-eighth of one-thousandth of an inch.

A gear-cover 293 for the gear 257 is provided to protect said gear from dust and dirt and also furnishes a bearing for a portion of the automatic feed mechanism, described as follows: A pinion 295 is revolubly mounted suitably to said gear-case and is provided with the flange 296, between which and the gear-case the rack 297, engaging said pinion, slides. The connecting-rod 298 is journaled, by means of crank-pin 298', to the outside of said flange and is journaled at the other end to the cross-head 299, which is slidably mounted in the slideways 300 on said gear-case. The pawl 301, having the tooth 302 for engaging the teeth of the gear, is journaled to said cross-head. Said pawl is provided with the extension 304, which is adapted to engage the shield 305. Said shield is fastened to the arm 267 and extends over a series of the teeth of the gear 257 toward said pawl. As the pawl 301 is reciprocated and the gear having the arm and shield fast thereto is fed thereby the shield gradually nears said pawl and finally comes into contact with the same, throwing and holding it out of engagement with the gear-teeth. Thus the automatic feed mechanism can be set to be stopped at a certain predetermined point, as the index-pin can be moved to any hole, moving the shield and uncovering more or less teeth of the gear 259. The rack is provided with the arm 305, embracing the pinion on its under side, thus holding the rack in engagement with the pinion. The end of the rack is journaled to the adjustable block 306, which may be set at any position on the curved slide 307. The curved slide 307 is fastened at 308 to the reversing-lever 131 and is moved thereby when the shifting lever is moved. As the shifting lever is moved the rack revolves the pinion and the crank-pin 298 is carried from one side of and above its lowest position to the other side of and above said position, the distance said crank-pin travels depending on the adjustment of the block 306 on the arm 307. Thus it will be seen that the pawl 301 is always fixed as to its lower limit of movement.

The operation of the hand-feed for the wheel-carriage is as follows: The nut 265 is loosened, permitting the hand-wheel 263 and its connected arm 266 to revolve on the shaft 255. Said arm 266 is fast to the gear 259 by means of the pinion 272, which does not revolve when the index-pin is set in one of the index-holes. Thus by the revolution of the hand-wheel the gear 259, which carries the pinion 257, meshing with the gear 251 on the feed-screw, is revolved and the wheel-carriage moved. The micrometer feed is connected by tightening the nut 265, making the wheel 263 fast on the shaft 255. Thus the bearing of the barrel 271 has a fixed position, and when the index-pin is drawn out and moved from hole to hole the pinion 272 revolves the gear 259 its measured distance and in turn the feed-screw 233.

I have described the mechanism which I claim as my invention as applied to a grinding-machine; but it is obvious that it may be applied to other machines without departing from its spirit and scope. I have, furthermore, not attempted to describe the changes and modifications which may be made without departing from the invention. For example, it will be clear that several features of my invention may be applied to that type of grinding-machine in which the wheel is reciprocated and the work held stationary. Such adaptations are, however, within the scope of my invention and are intended to be protected herein; but

What I claim, and desire to secure by Letters Patent, is—

1. In a grinding-machine the combination with a suitably-mounted grinding-wheel, of suitable work-holding means and separated horizontal ways for said work-holding means, the plane of said ways being inclined from a point opposite the wheel downward to a point beneath the work.

2. In a grinding-machine the combination with a grinding-wheel, work-holding means, means for moving the work and wheel together, separated horizontal ways for said work-holding means, the plane of said ways being inclined to the plane on which the work and wheel are moved together.

3. In a grinding-machine the combination with a wheel-slide, a grinding-wheel mounted thereon, work-supporting devices, and horizontal ways for said devices, the plane of said ways being inclined to the plane of said wheel-slide.

4. In a grinding-machine the combination with a suitably-mounted grinding-wheel, of a work-supporting table, having an inclined front forming a permanent water-guard and provided with horizontal ways, the plane of which is inclined in front of said wheel, and work-holding means mounted on said ways.

5. In a grinding-machine the combination with a suitably-mounted grinding-wheel, of a work-supporting table, having an inclined face forming a permanent water-guard and head and tail stocks mounted on separated ways located on opposite sides of said face.

6. In a grinding-machine the combination with a suitably-mounted grinding-wheel, of a work-supporting table, having an inclined front forming a permanent water-guard, head and tail stocks mounted on said table, and horizontal ways for said head and tail stocks, one of which is located at the front and the other at the back of said table.

7. In a grinding-machine the combination with a suitably-mounted grinding-wheel, work-holding means, means for moving the work and wheel together and separated horizontal ways for said work-holding means, the plane of said ways being inclined to the horizontal and approaching the normal to the line of pressure between the work and wheel.

8. In a grinding-machine the combination with a suitably-mounted grinding-wheel of a work-supporting table having widely-separated inclined ways, head and tail stocks adapted to slide on said ways and clamping means for said head and tail stocks located between said ways.

9. In a grinding-machine the combination with a suitably-mounted grinding-wheel, of a work-supporting table of substantially triangular cross-section and having an inclined front forming a permanent water-guard, of head and tail stocks mounted on said table, and horizontal ways for said head and tail stocks, one of which is mounted substantially beneath the work.

10. In a grinding-machine the combination with a base, of a table suitably mounted over said base, head and tail stocks which are supported by said table, two supporting-ways on said table for supporting said head and tail stocks, one of said ways being located substantially at the base of said table and the other of said ways being located above said base of said table and separated at a distance from said first-mentioned way.

11. In a grinding-machine, the combination with a base, of a table suitably mounted over said base, head and tail stocks which are supported by said table, two supporting-ways on said table for supporting said head and tail stocks, one of said ways being located substantially at the base of said table and substantially under the work, the other of said ways being located above said base of said table and separated therefrom by a side of said table, and clamping means for said head and tail stocks respectively located between said ways.

12. In a grinding-machine, the combination with a base, of a table supported over said base, said table being of substantially triangular form and having its base, at the apex formed with the same and a slanting side, extending substantially under the axis of the work, and having a slanting side extending toward a level with the axis of the work and forming a permanent water-guard, said table having two supporting-ways, one located on said slanting side near the base of said table and the other located on the back side near the top thereof, and head and tail stocks supported on said ways, substantially as described.

13. A grinding-machine comprising a base, a table, a grinding-wheel arranged at one side thereof, means for reciprocating said table, head and tail stocks which are supported by said table, means for rotating the work about an axis between said head and tail stocks, two guideways on said table for supporting said stocks, one of said ways consisting of a plane surface which is located at the side of the table next the wheel, substantially under said axis, and the other way consisting of two surfaces arranged at an angle and located on the opposite side of the table above the way first named.

14. A grinding-machine comprising a base, a table, a grinding-wheel which is arranged at one side of said table, means for reciprocating said table, head and tail stocks, means for rotating the work about a fixed axis therebetween, two guideways on said table for supporting said stocks, one of said ways being located at the side of table nearest the wheel and substantially under said axis, and the other way being located on the opposite side of said table, above the way first named and at the opposite side of the work from the wheel.

15. The combination with a table having a slanting side forming a permanent water-guard, of work-supporting means located at opposite sides of said slanting side, of a groove in said slanting side between said ways, and a clamping-bolt engaging said groove.

16. The combination with a base, of a platen which is adapted to slide thereon, a table which is supported on said platen, a swivel connection between said platen and table, a worm-rack swiveled to said platen and slidable in a groove in said table, a worm-gear journaled in said table and engaging said rack and an operating-handle for said worm-gear, substantially as described.

17. In a grinding-machine, the combination with a base, of substantially T-shaped form in plan section, a platen mounted on the portion of said base corresponding to the horizontal portion of the T, work-supporting devices mounted on said platen, a grinding-wheel journaled and supported over the portion of said base corresponding to the vertical portion of the T, and movable along said vertical portion to and from said horizontal portion, a water-tank located in the angular space at one side of said vertical portion between the same and one side of the horizontal portion of the T substantially beneath the grinding-wheel, means for supplying water to the grinding-face of said wheel, and water-guards arranged to prevent water from flowing over the bearing-surfaces and to discharge said water directly into said tank, substantially as described.

18. A grinding-machine comprising a base, a grinding-wheel, a water-tank located at the rear side thereof, a table which is supported by said base which is shaped similarly to a right triangle in cross-section, and having its inclined side facing the wheel and forming a permanent water-guard, suitable work-supports carried by said table on its inclined side, means for reciprocating said table and means for discharging a suitable supply of water on said wheel, and water-guards coöperating with the inclined side of said table for returning the water directly to the tank without the employment of gutters in said table.

19. The combination with suitable work-supporting devices of a suitably-mounted grinding-wheel, means for accomplishing a reciprocatory movement between the work and wheel, a driving pulley and belt for said means and variable-speed mechanism adapted to vary the speed of said reciprocatory movement independent of the speed of said pulley and belt.

20. The combination with a table, of work-supporting devices carried thereby, a suitably-mounted grinding-wheel, a driving pulley and belt for rotating the work and means whereby shifting the belt varies the speed of rotating the work independently of the speed of said belt.

21. The combination with suitable work-supporting devices, of a suitably-mounted grinding-wheel, means for rotating the wheel, means for rotating the work, a speed-changing mechanism for varying the speed of rotating said work, means for accomplishing a reciprocatory movement between the work and wheel, speed-changing mechanism for varying the speed of said reciprocatory movement, each speed-changing means being independent of the other, whereby either can be changed through its respective range of speeds without changing the other.

22. The combination with a grinding-machine having suitable driving means, of a grinding-wheel, work holding and rotating devices, reciprocating devices for accomplishing a reciprocatory movement between work and wheel, of a speed-changing device for said work and a speed-changing device for said reciprocatory movement, each of said speed-changing devices being located on the machine and independent of the driving means, whereby all changes of speed are effected at the machine independent of the driving means.

23. In a grinding-machine having a suitably-mounted grinding-wheel and work-supporting devices, means for rotating the work, means for accomplishing a reciprocatory movement between said work and wheel and means for stopping the rotation of the work independently of any other operation of the machine.

24. In a grinding-machine having a suitably-mounted grinding-wheel and work-supporting devices, means for rotating the work, means for accomplishing a reciprocatory movement between said work and wheel and means for stopping the rotation of the work without stopping said reciprocatory movement comprising a swinging cone resting by its own weight in its driving-belt, whereby said cone can be raised and the work stopped.

25. A grinding-machine comprising a table, a grinding-wheel, work-supporting devices which are carried thereby, driving means which rotate at a fixed speed, for rotating the work about its axis, intermediate belt-and-cone means for varying the speed of rotation of the work, means for reciprocating said table, and belt-and-cone means for varying the speed at which said table is moved independently of the speed at which the work is rotated.

26. A grinding-machine comprising a table, a grinding-wheel, work-supporting devices which are carried thereby, a plain driving-pulley from which the reciprocating table is driven, a cone-pulley for varying the speed of the reciprocating table, a belt between said plain pulley and cone-pulley, means for keeping said belt in operative engagement with said pulleys, and means connected with said pulleys for reciprocating said table and means for guiding and holding said belt.

27. A grinding-machine comprising a table, a grinding-wheel, work-supporting devices which are carried thereby, a plain driving pulley or drum from which the work is driven, a cone-pulley for varying the speed of the work, a belt, means for keeping said belt in operative engagement with said pulleys, and means for guiding and holding said belt.

28. The combination with a base, of a grinding-wheel, work-supporting devices mounted over said base, means for accomplishing a reciprocatory movement between the work and wheel, means for rotating the work about its axis comprising a driving-pulley, an endless belt, and stepped cone having a surface of revolution of gradually-increasing diameter between its steps, and means for keeping said belt taut in whatever position it may be on said cone.

29. The combination with a base, of a grinding-wheel, work-supporting devices mounted over said base, means for reciprocating said work with relation to said wheel, means for rotating the work about its axis at different speeds comprising a driving-pulley of uniform diameter, an endless belt and stepped cone having substantially conical sections between its steps, said cone being swung in a loop of said belt, the latter being held taut by the weight of said cone.

30. The combination with a base, of a grinding-wheel, work-supporting devices mounted over said base, a rotating drum of substantially uniform diameter, means driven from said drum, and speed-varying mechanism comprising a cone, a belt, an adjustable belt-guide for moving the belt up and down the cone, means for holding said guide at different points along the cone, and means for keeping the belt in operative engagement between the drum and cone.

31. The combination with a base, work-supporting devices mounted over said base, a rotating drum of substantially uniform diameter, means driven from said drum for rotating the work about its axis at different speeds comprising a cone, pivoted arms connected with and extending laterally from one of said work-supporting devices for supporting said cone, a belt which passes around said drum and cone, an adjustable belt-guide, means for locking the same at each step of the cone, said parts being arranged so that said cone will be supported by the belt in various positions of the latter thereon, whereby the belt is held taut by the weight of the core.

32. The combination with a base, of work-supporting devices mounted over said base, a belt, a rotating pulley or drum, a stepped speed-cone having conical sections between the steps thereof for the belt to ride up and down when shifted, and a shifting and guiding mechanism for shifting and guiding said belt, substantially as described.

33. The combination with a base, of work-supporting devices mounted over said base, a grinding-wheel suitably mounted on said base, means for accomplishing a reciprocatory movement between said wheel and work, speed-change mechanism for said reciprocating means comprising a driving drum or pulley, a cone, a belt from said pulley to said cone, means for taking up the slack in said belt whatever the position of the same on said cone, and means for shifting said belt to its various positions on said cone.

34. The combination with a base, of a reciprocating platen mounted on said base, means for reciprocating said platen on said base, and platen speed-change mechanism comprising a driving-pulley, a stepped speed-cone having conical sections between said steps for the belt to ride up and down when shifted, a belt which passes around said pulley and said cone, an adjustable belt-guide, means for locking the same at each step of the cone, and idler means for taking up the slack of said belt.

35. A machine of the class described comprising a base, a platen, work-supporting devices which are carried thereby, means for rotating the work about its axis comprising a drum and cone, and a driving-belt which passes over said cone, and means for taking up slack in said belt, means for moving said table with respect to said base, said means comprising a drum and cone, a driving-belt which passes thereover, and means for taking up the slack in said belt in the various positions of the latter on said cone.

36. The combination with a base, of a grind-wheel, a reciprocating table, a rotating driving-pulley for operating said table, a speed-changing means for varying the speed of reciprocating table comprising a cone-pulley, a belt, an adjustable belt-guide, a clutch, speed-changing gears and gearing means connected with said table adapted to be connected with said speed-changing means by said clutch.

37. A grinding-machine having a table for the work in combination with a grinding-wheel, means for advancing said wheel toward the work upon each reciprocation of the table, comprising a ratchet-wheel, connections between said ratchet-wheel and the grinding-wheel support which are adapted to move said grinding-wheel and work together when said ratchet-wheel is rotated, a suitably-guided reciprocating pawl, means for reciprocating said pawl whereby the limit of its travel in one direction is fixed, and means for varying the amplitude of its reciprocation in the other direction, substantially as described.

38. A grinding-machine having a support for the work in combination with a grinding-wheel, means for advancing said wheel toward the work upon each reciprocation between the work and wheel comprising a ratchet-wheel, connections between said ratchet-wheel and the grinding-wheel support which are adapted to move said wheel and work together, a suitably-guided reciprocating pawl, a crank-pin, connections between said pawl and crank-pin, means operated at the limit of each reciprocation between work and wheel for oscillating said crank-pin about its axis whereby said pawl is drawn to its limit as the crank-pin passes the dead-center, thus rotating the ratchet-wheel.

39. A grinding-machine having a reciprocating table for supporting the work, a grinding-wheel having a movable support, means for advancing said wheel toward the work upon each reciprocation of the table comprising a ratchet-wheel, connections between said ratchet-wheel and the grinding-wheel support which are adapted to move said support when said wheel is rotated, a suitably-guided reciprocating pawl, a crank-pin, connections between said pawl and crank-pin, means operated by said table as it reaches the limits of its travel, for oscillating said crank-pin about its axis, and means for varying the amplitude of its oscillations, whereby said pawl is drawn back to its fixed limit as the crank-pin passes the dead-center rotating the ratchet-wheel and advances to its variable limit as the crank-pin passes the dead-center and finishes its oscillation.

40. A grinding-machine having a reciprocating table for supporting the work, a grinding-wheel having a movable support, means for advancing said wheel toward the work upon each reciprocation of the table, comprising a ratchet-wheel, connections between said ratchet-wheel and the grinding-wheel support which are adapted to move said support when said wheel is rotated, a suitably-guided reciprocating pawl, a crank-pin means operated by said table as it reaches the limits of its travel, for oscillating said crank-pin about its axis, whereby said pawl is drawn back to its fixed limit as the crank-pin passes the dead-center rotating the ratchet-wheel and advances to its variable limit as the crank-pin finishes its oscillation and means for automatically disengaging said pawl from the ratchet-wheel at predetermined points in the rotation of said ratchet-wheel.

41. A machine of the class described having a work-supporting table, an operative tool, means for feeding the same toward the work, said means comprising a ratchet-wheel, a pawl which is adapted and arranged to engage said wheel, means for reciprocating said pawl through a predetermined path, an arm, an adjustable tripping device carried thereby, a pinion carried by said arm which engages the teeth of said wheel, means for rotating said pinion so to adjust the position of said tripping device with respect to the path of said pawl.

42. A grinding-machine comprising a work-supporting table, a grinding-wheel, means for forcing the same toward the work, comprising a feed-screw, a gear secured thereto, a fixed shaft, a ratchet-wheel journaled thereon having a gear which is arranged to engage said feed-screw gear, a hand-wheel which is also journaled on said shaft, means for clamping said wheel to said shaft, an arm secured to said hand-wheel, a pinion having a shank which is journaled in said arm and which engages the teeth of said ratchet-wheel, means for rotating said pinion and for locking the same to said arm, a shield carried by said arm which covers a number of the teeth of said ratchet-wheel, a ratchet, means for reciprocating the same and causing the same to turn the ratchet-wheel, said shield being adapted to throw the ratchet out of engagement with the wheel when the latter has been turned a predetermined distance.

43. In a grinding-machine, the combination with a work-supporting table, a grinding-wheel, means for forcing the same toward the work, comprising a feed-screw, a gear secured thereto, a fixed shaft, a ratchet-wheel journaled thereon having a gear which is arranged to engage said feed-screw gear, a hand-wheel which is also journaled on said shaft, means for clamping said wheel to said shaft, an arm secured to said hand-wheel, a pinion having a shank which is journaled in said arm which engages the teeth of said ratchet-wheel, means for rotating said pinion and for locking the same to said arm.

44. In a grinding-machine, the combination with a work-supporting table, a grinding-wheel, means for forcing the same toward the work comprising a feed-screw, a ratchet-wheel connected with said feed-screw, an arm revoluble with said ratchet-wheel, means for fixing said arm from revolving therewith, a pinion mounted in said arm engaging said ratchet and adapted to revolve said ratchet-wheel when said arm is fixed, and means for locking said pinion to said ratchet-wheel when said arm is revoluble.

45. In a grinding-machine, the combination with a work-supporting table, a grinding-wheel, means for forcing the same toward the work comprising a feed-screw, a gear secured thereto, a fixed shaft, a ratchet-wheel journaled thereon having a gear which is arranged to engage said feed-screw gear, a hand-wheel journaled on said shaft, means for securing said hand-wheel to said ratchet-wheel.

46. In a grinding-machine, the combination with a work-supporting table, a grinding-wheel, means for forcing the same toward the work, comprising a feed-screw, a gear secured thereto, a fixed shaft, a ratchet-wheel journaled thereon having a gear which is arranged to engage said feed-screw gear, a hand-wheel journaled on said shaft, an arm secured to said hand-wheel and means mounted on said arm for engaging the teeth of said ratchet-wheel whereby said arm and hand-wheel are secured to said ratchet-wheel.

47. In a grinding-machine, the combination with a work-supporting table, a grinding-wheel, means for forcing the same toward the work comprising a feed-screw, a gear secured thereto, a fixed shaft, a ratchet-wheel journaled thereon having a gear which is arranged to engage said feed-screw gear, an arm adapted to be fixed to said shaft, a pinion engaging the teeth of said ratchet journaled in said arm, and means for locking said pinion to said arm.

48. In a grinding-machine, the combination with a work-supporting table, a grinding-wheel, means for forcing the same toward the work comprising a feed-screw, a gear secured thereto, a fixed shaft, a ratchet-wheel journaled thereon having a gear which is arranged to engage said feed-screw gear, an arm adapted to be fixed to said shaft, a pinion engaging the teeth of said ratchet journaled in said arm, means for locking said pinion to said arm, and means for disengaging said pinion from said ratchet.

49. In a grinding-machine, the combination with a work-supporting table, a grinding-wheel, means for forcing the same toward the work comprising a feed-screw, a gear secured thereto, a fixed shaft, a ratchet-wheel journaled thereon having a gear which is arranged to engage said feed-screw gear, an arm adapted to be fixed to said shaft, a pinion revolubly mounted in said arm and engaging the teeth of said ratchet, an index, and means for fixing said pinion fast with said index.

50. In a grinding-machine, the combination with a work-supporting table, a grinding-wheel, means for forcing the same toward the work comprising a feed-screw, a gear secured thereto, a fixed shaft, a ratchet-wheel journaled thereon, having a gear which is arranged to engage said feed-screw gear, an arm adapted to be fixed to said shaft, a slidable pinion revolubly mounted in said arm and engaging the teeth of said ratchet, an index mounted in said arm, and a slidable index-pin connected with said pinion and adapted to fit the holes in said index.

51. A grinding-machine, comprising a work-supporting table, a grinding-wheel, means for forcing the same toward the work, comprising a feed-screw, a gear secured thereto, a fixed shaft, a ratchet-wheel journaled thereon, having a gear which is arranged to engage said feed-screw gear, a hand-wheel which is also journaled on said shaft, means for clamping said wheel to said shaft, an arm secured to said hand-wheel, a pinion having a shank which is journaled on said arm which engages the teeth of said ratchet-wheel, means for rotating said pinion and for locking the same to said arm, a shield carried by said arm which covers a number of the teeth of said ratchet-wheel, a ratchet, means operated by the reciprocation of the work with relation to the grinding-wheel for reciprocating the same and causing the same to turn the ratchet-wheel, said shield being adapted to throw the ratchet out of engagement with the wheel when the latter has been turned a predetermined distance, and means for permitting the disengagement of said pinion with the teeth of said wheel whereby the position of the shield may be more readily changed.

52. A machine of the character described having an operating-tool, a support therefor, means for adjusting the position of said support comprising a male screw, a corresponding female screw on the under side of said support, suitable bearings for said male screw, and a suitable boxing or receptacle providing a bath of oil for same.

53. A machine of the character described having an operating-tool, a support therefor, means for adjusting the position of said support comprising a male screw, a corresponding female screw connected with the under side of said support, and a bearing or cradle for said male screw beneath said support.

54. A machine of the character described having an operating-tool, a support therefor, means for adjusting the position of said support comprising a screw, a half-nut or correspondingly-threaded recess on the under side of said support on which the upper half of the screw is located, a smooth cradle or semicircular bearing on which the lower half of the screw rests, a bath of oil which is constantly maintained above the lowest point of said cradle-bearing whereby said screw will be automatically lubricated as it is rotated.

55. The combination with a base, of a grinding-wheel, a reciprocating table and a reversing mechanism for said reciprocating table comprising two cam-shaped dogs, means for adjustably securing the same at different points on said table, a reversing-lever, means for reversing the direction of travel of the table when said lever is thrown in opposite positions, a slidable block which is connected to said lever and is normally engaged by said dogs to throw the lever at the end of travel of the table, but which is adapted to ride over said dogs when the table is moved outside of said limits.

56. The combination with a platen, of means for reciprocating the same comprising a driving-shaft, a reversing-lever, adjustable dogs secured to said platen for throwing said lever as the platen reaches the limits of its travel in either direction, a sliding rod, a clutch, an integral clutch connection engaging pivoted dogs, said dogs one at each end of said rod for locking the same in its extreme positions, a spring on each side of said lever through which said lever acts to move said rod to throw the clutch, and means operated by said lever for releasing said dogs in turn when the adjacent spring has been compressed sufficiently to throw the clutch with suitable force.

57. In a grinding-machine, the combination with a reciprocating platen, of feed mechanism engaging thereunto, comprising a train of gears connected with the feed drive-shaft, a plate on which said train of gears is mounted, reversing mechanism mounted on said plate whereby said reversing mechanism and said feed mechanism are assembled on a single plate, said plate being fastened to said base.

58. In a grinding-machine, the combination with a reciprocating platen, of a hand feed mechanism for said platen, of automatic feed mechanism adapted to be connected with said hand feed mechanism, and automatic reversing mechanism connected with said automatic feed, and a plate on which said hand feed, automatic feed and automatic reversing mechanism are mounted and fastened to the said base of the machine, substantially as described.

59. In a grinding-machine having a base, a grinding-wheel and reciprocating table, of speed-changing means for varying the speed of travel of said table, a plate on which said speed-changing mechanism is assembled and mounted, said plate being attached to said base.

Signed by me at Worcester, Massachusetts, this 18th day of January, 1901.

CHARLES H. NORTON.

Witnesses:
ALDUS C. HIGGINS,
CHAS. L. ALLEN.